United States Patent Office 3,403,967
Patented Oct. 1, 1968

3,403,967
2,4'-DIHYDROXY-3',5'-DITERTIARY-BUTYL-BENZOPHENONE AND COMPOSITIONS STABILIZED THEREWITH
Lester N. Stanley, Delmar, N.Y., assignor to GAF Corporation, a corporation of Delaware
No Drawing. Continuation of application Ser. No. 121,300, July 3, 1961. This application Nov. 18, 1966, Ser. No. 595,543
10 Claims. (Cl. 8—76)

ABSTRACT OF THE DISCLOSURE

As an ultra-violet light absorber a compound 2,4'-dihydroxy-3',5'-ditertiary-butylbenzophenone and compositions stabilized therewith.

This application is a continuation of application Ser. No. 121,300, filed July 3, 1961, now abandoned.

This invention relates to a new and useful organic compound and to compositions containing same, and more particularly to the compound 3',5'-ditertiary-butyl-2,4'-dihydroxy-benzophenone, and to compositions which are stabilized therewith against degradation and deterioration, particularly in the presence of ultra-violet radiation.

Benzophenone compounds, and especially hydroxybenzophenones, have in recent years become increasingly important as stabilizers for various organic materials which are exposed to actinic radiation, and particularly ultra-violet light. Such compounds are characterized by having relatively large absorptions within the region of the near ultra-violet, and particularly in the region of from about 300 to 400 mu. By virtue of the ability of such compounds to absorb these radiations, the surrounding environment or media are given varying degrees of protection against the ultra-violet light depending upon the concentration of the ultra-violet absorber and the particular environment or medium involved. In general, the hydroxybenzophenone compounds have proven exceptional for such purposes. There are, however, many deficiencies of these compounds which render them unacceptable for many uses for which they would normally be indicated. Thus, in alkaline systems, the heretofore employed benzophenone compounds which were suitable as ultra-violet absorbers produced a yellow coloration and thereby imparted a degree of yellowness to such systems in which they were incorporated, which was in many instances undesirable. Among such systems, mention may be made of rubber latex and polyurethane compositions. In the latter, hydroxybenzophenone absorber forms yellow colored salts with the strongly basic amines such as methyl morpholine which are commonly used as catalysts for the polymerization of these materials. In other resin systems such as polyesters, the solubility of the heretofore used hydroxybenzophenones is so low as to render the absorber incapable of adequate protection due to the low concentration thereof. In addition, many of such absorbers exhibit a tendency to bloom out of the final resin because of incapatibility. Still another system wherein ultra-violet absorbers are indicated is paint. Most paint formulations employ mineral spirits extensively as the solvent medium. An example of such a solvent is Varsol No. 1. The known hydroxyphenones are in general insoluble in mineral spirits and therefore it becomes extremely difficult to obtain an adequate and satisfactory concentration thereof in paint formulations in order to protect the paint from deterioration, in order to protect the pigment incorporated in the paint, and in order to protect the object painted.

The compound of the present invention is not only an outstanding ultra-violet light absorber and therefore capable of protecting organic medium against deterioration and degradation due to such light energy, but it has been found that this compound has excellent solubility in many organic solvents. It is nonblooming for many of the systems above described, and finally, imparts no color or forms no coloration in alkaline systems. Because, therefore, of its excellent solubility characteristics, because of its nonblooming features, and because of its lack of color in alkaline systems, the compound of this invention is especially useful for incorporation in numerous paint, polyester, rubber latex, and polyurethane systems.

It is therefore an object of the present invention to provide as a new compound 3',5'-ditertiary-butyl-2,4'-dihydroxybenzophenone.

It is still a further object of the present invention to provide processes for the preparation of 3',5'-ditertiary-butyl-2,4'-dihydroxybenzophenone.

It is still a further object of the present invention to provide compositions which are stabilized against ultra-violet light deterioration and/or degradation.

It is still another object of the present invention to provide compositions which are stabilized against the degrading effects of actinic radiation, and particularly ultra-violet light by the incorporation therein of 3',5,-ditertiary-butyl-2,4'-dihydroxybenzophenone.

Other objetcs will appear hereinafter as the description proceeds.

The following examples will serve to illustrate the preparation of the compound of the present invention and the advantages of compositions containing same. In these examples, which are given by way of illustration only, all parts and percentages are by weight unless otherwise indicated.

EXAMPLE 1

Preparation of 3',5'-ditertiary-butyl-2,4'-dihydroxybenzophenone 380 g. of polyphosphoric acid and 254 g. of phosphoric acid 85% are mixed to produce 634 g. or phosphoric acid having an $H_3PO_4$ content of 102%, and then cooled to 30° C. 134 g. of anhydrous zinc chloride, 60 g. of salicylic acid and 89.5 g. of 2,6-ditertiary butylphenol are added. The mixture is stirred and heated to 40° C. until a uniform slurry is formed. 76 g. of $PCl_3$ is added dropwise in about 1½ to 2 hrs. at 40–45° C. The reaction mix is maintained at 45° C. for 5 hrs., and then at 55° C. for 14 hrs. The reaction mix is drowned into a large volume of ice and water, filtered and washed with water, then with 5% sodium bicarbonate solution and then with water. For a final purification, it is dissolved in a mixture of 1250 g. of methyl alcohol and 750 g. of methyl ethyl ketone, clarified by treatment with 3.0 g. of Nuchar (absorbent charcoal), cooled to 5° C., filtered and dried at 70° C. 97 g. of pure white crystals is obtained, M.P. 157.0–158.4° C.

In addition to the above method illustrating the preparation of the subject compound, it is of course understood that any method conventionally used for the preparation of hydroxybenzophenones may be used for the preparation of the instant compound.

EXAMPLE 2

A good spar varnish consists primarily of a combination of nonvolatile ingredients which include resinous materials and oils of the drying type and volatile ingredients which include alcohols, turpentine and hydrocarbon solvents. The additions of 0.01–5% of ultra-violet agents increases the stability of the varnish through protection from deterioration of the varnish per se from ultra-violet light and also gives added protection to the object coated.

The problem in the past has been to find satisfactory ultraviolet agents which are sufficiently soluble in varnish formulation, especially those of the type which include mineral spirits such as Varsol No. 1. It has now been found that 3',5'-ditertiary-butyl-2,4'-dihydroxybenzophenone is satisfactory for such use. The following exemplifies such a formulation:

A spar varnish formulation is made up which comprises:

| | Parts |
|---|---|
| Phenol-formaldehyde resin | 28 |
| Tung oil | 60 |
| Castor oil | 10 |
| Linseed oil | 2 |
| n-Butanol | 5 |
| Turpentine | 10 |
| Varsol No. 1 | 75 |
| Petroleum naphtha | 10 |
| 3',5'-ditertiary-butyl-2,4'-dihydroxybenzophenone | 3 |

After varnishing and exposing test strips of wood to sunlight for 50 weeks, a strip which contains the ultra-violet agent shows less discoloration and greater gloss than a strip treated with a similar formulation but without the ultra-violet agent.

EXAMPLE 3

Wall paints primarily comprise pigmentation and binder, but the particular properties of each paint are affected by the proper selection of oils and varnishes, acidity, proper selection of extenders, evaporation rate of the thinners, viscosity of the oils or varnishes used and the like.

A gloss wall paint is made up as follows:

| | Pounds |
|---|---|
| Lithopone | 344.0 |
| Rutile titanium calcium pigment | 243.0 |
| Kettle bodied linseed oil (Body X–Y) | 122.0 |
| Ester gum solution 65% solids | 41.5 |
| 25 gal. wood oil varnish (43% solids) | 369.0 |
| Varsol No. 1 | 66.4 |
| 24% lead naphthenate | 2.0 |
| 6% cobalt naphthenate | 0.8 |
| 3',5'-ditertiary-butyl-2,4'-dihydroxybenzophenone | 4.0 |

After painting test strips and exposing to sunlight for 50 weeks, a strip painted with a paint comprising the ultra-violet agent shows less yellowing and greater gloss than a strip painted with the same paint minus the ultra-violet agent.

EXAMPLE 4

A polyester resin is prepared by coreacting 3 mols of phthalic anhydride, 3 mols of fumeric acid and 6.6 mols of propylene glycol. When esterification is substantially complete, as indicated by an acid number of about 30–40, styrene is added in a sufficient amount to equal ½ of the polyester resin present. 0.02%, based on the total weight, of di-tertiary butylhydroquinone is added.

To 200 parts of this resin mixture is added 2 parts of lauryl mercaptan as a 10% solution in styrene, 2 parts of methyl ethyl ketone peroxide and 1 part by weight of 3',5'-ditertiary-butyl-2,4'-dihydroxybenzophenone. This is poured into a suitable mold and cured in an oven by gradually heating to 250° F. and holding for 3 hours.

On exposure to light in a fadeometer for 300 hrs. this sample shows less deterioration and discoloration than a similar sample made excluding the ultra-violet absorber.

EXAMPLE 5

200 g. of diphenylmethane diisocyanate is added to 246 g. of castor oil with constant agitation, holding the temperature at 70° C. for about one hour. The product is degassed by heating at 100° C. under a 5 min. vacuum until bubbling ceases. The vacuum is broken by bleeding in dry nitrogen. The resin is cooled to 70° C. 4 g. of an ethylenediamine-propylene oxide addition product (Quadrol of Wyandotte Chemical) and 2 g. of 3',5'-ditertiary-butyl-2,4'-dihydroxybenzophenone are added. Vacuum is again applied until bubbling ceases and it is released as before. A casting is made between plates treated with mold-release agent and fitted with a gasket material between the plates, and the latter are clamped together.

The resin is cured at 100° C. for 18 hours. The resin has good toughness and resilience properties. The resin, when treated with ultra-violet agent, is more stable to deterioration by sunlight than a resin prepared in similar manner but excluding the ultra-violet agent.

EXAMPLE 6

0.5 part by weight of 3',5'-ditertiary-butyl-2,4'-dihydroxybenzophenone is milled with 100 parts by weight of a high density polyethylene resin commercially available under the brand name of Fortiflex A–70 (density 0.96) on a two roll mill at 120° C. until uniform. While still hot, the batch is passed through a two roll cold mill to obtain a rough sheet of polyethylene. A small piece was cut and pressed out between two thin aluminum sheets on a Carver press at approximately 110° C. to a film having an approximate thickness of 6 mils. After 6 months storage, the film shows no sign of blooming and is as transparent as a similar film made without the ultra-violet absorber. In addition, spectro curves of the film before and after 110 hrs. exposure in a fadeometer shows relatively little change in absorptive power. There is no brittleness or loss of flexibility in the film which occurs when no ultra-violet light absorber is used as a control.

While the compound of this invention has been described particularly for use in certain preferred organic systems, it is clear that it may be used in general as a stabilizer for organic substances which are susceptible to ultra-violet radiation degeneration. Thus, other plastics and resins in film, fiber, molded or foamed form, may be protected. Dyes and pigments per se or in other organic media, e.g., resins, plastics, plasticizers and solvents, dispersants and the like may be stabilized. Waxes, gasoline, lubricating oils, polyolefines and the like are other systems which are admirably protected by the compound of this invention.

The amount of stabilizer to be used in any organic system is not critical except, of course, that sufficient thereof should be present to effect the desired degree of stabilization. In general, from about 0.001% to about 10% by weight based on the weight of organic to be stabilized may be used and preferably from 0.01% to about 5% is usually indicated.

Other variations in and modifications of the described processes which will be obvious to those skilled in the art can be made in this invention without departing from the scope or spirit thereof.

I claim:
1. 3',5'-ditertiary-butyl-2,4'-dihydroxybenzophenone.
2. A composition stabilized against degradation by utraviolet light comprising an organic carrier susceptible to degradation by ultraviolet radiation and an amount of 3',5-ditertiary-butyl-2,4'-dihydroxybenzophenone sufficient to effect stabilization thereof.
3. A composition stabilized against degradation by ultraviolet light comprising an organic carrier susceptible to degradation by ultraviolet radiation and from about 0.001% to about 10% by weight based on the weight of said organic carrier of 3',5'-ditertiary-butyl-2,4'-dihydroxybenzophenone.
4. A composition stabilized against degradation by ultraviolet light comprising an organic carrier susceptible to degradation by ultraviolet radiation and from about 0.01% to about 5% by weight based on the weight of said organic carrier of 3',5'-ditertiary-butyl-2,4'-dihydroxy benzophenone.
5. A composition as defined in claim 2 wherein the organic carrier comprises a drying oil.
6. A composition as defined in claim 2 wherein the organic carrier comprises a drying oil-modified resin.

7. A composition as defined in claim 2 wherein the organic carrier comprises a polyester.

8. A composition as defined in claim 2 wherein the organic carrier comprises a polyurethane.

9. A composition as defined in claim 2 wherein the organic carrier comprises a polyolefin.

10. A composition as defined in claim 2 wherein the organic carrier comprises a dyestuff.

References Cited

UNITED STATES PATENTS

| | | | |
|---|---|---|---|
| 2,853,521 | 9/1958 | Hardy et al. | 260—45.95 |
| 3,000,853 | 9/1961 | Havens | 260—591 |
| 3,008,995 | 11/1961 | Hoeschele et al. | 260—45.95 |
| 2,777,828 | 1/1957 | Day et al. | 260—45.95 |
| 3,215,530 | 11/1965 | Riebel | 96—48 |
| 2,682,559 | 6/1954 | Stanley et al. | 260—591 |
| 3,043,709 | 7/1962 | Amborski | 117—7 |
| 3,073,866 | 1/1963 | Stanley | 260—591 |
| 3,092,663 | 6/1963 | Stanley | 260—591 |
| 3,105,094 | 9/1963 | Hoeschele | 260—591 |
| 3,226,358 | 12/1965 | Smith et al. | 260—45.95 |

FOREIGN PATENTS 599,206   5/1960   Canada.

DONALD E. CZAJA, *Primary Examiner.*

F. McKELVEY, *Assistant Examiner.*